United States Patent [19]
Hardy

[11] 4,018,326
[45] Apr. 19, 1977

[54] VARIABLE LENGTH RECIPROCATING CONVEYOR SYSTEM FOR SPACING ARTICLES

[75] Inventor: Peter D. Hardy, Welwyn Garden City, England

[73] Assignee: The Metal Box Company Limited, Reading, England

[22] Filed: Oct. 1, 1975

[21] Appl. No.: 618,335

[30] Foreign Application Priority Data

Oct. 2, 1974 United Kingdom ............ 42712/74

[52] U.S. Cl. .............................. 198/461; 198/577; 198/594
[51] Int. Cl.² ...................................... B65G 117/26
[58] Field of Search ............ 198/34, 76, 110, 111, 198/461, 577, 594

[56] References Cited

UNITED STATES PATENTS

| | | | |
|---|---|---|---|
| 2,686,603 | 8/1954 | Lawson | 198/34 X |
| 3,115,237 | 12/1963 | Atkins | 198/34 |
| 3,370,693 | 2/1968 | Marsden | 198/34 |
| 3,931,879 | 1/1976 | Javerzat | 198/34 |

Primary Examiner—Evon C. Blunk
Assistant Examiner—Douglas D. Watts
Attorney, Agent, or Firm—Diller, Brown, Ramik & Wight

[57] ABSTRACT

A conveyor handling system is described in which two endless belts are serially arranged along a predetermined path. The rollers supporting the two belts at adjacent ends of the belts are mounted on a common rotary shaft. The rotary shaft is supported upon a reciprocatable carriage which also supports the downstream belt and when activated, the carriage is arranged to reciprocate the downstream belt bodily. The upper run of the upstream belt is extendable to follow the reciprocation of the downstream belt. The upstream belt is driven at a constant speed. The downstream belt, which is coupled to the rotary shaft through a one way clutch, is initially driven at the same speed as the upstream belt, but when the carriage is reciprocated (at a speed greater than the upstream belt), the clutch locks and the downstream belt adopts the speed of the carriage.

8 Claims, 4 Drawing Figures

VARIABLE LENGTH RECIPROCATING CONVEYOR SYSTEM FOR SPACING ARTICLES

BACKGROUND OF THE INVENTION

1. Field of the Invention

The invention relates to conveyor handling systems.

2. Description of the Prior Art

In a previously proposed conveyor handling system, two serially arranged endless belts are coupled together at their adjacent ends by a reciprocatable carriage which supports rollers around which the belts extend for rotation about mutually spaced parallel axes. Each belt is driven by a separate motor. The system is arranged to operate so that regularly arriving articles deposited on the upstream belt are transferred to the second belt in batches.

This prior conveyor handling system is of a complex nature requiring two carriages, two independently controlled motors, and a sophisticated synchronising system for synchronising the operation of the carriage with the motors. Furthermore, the transfer from one belt to another is unsatisfactory because of the existance of a gap between the two belts. In addition, the mode in which the system operates restricts the system to operation at relatively low speeds.

It is an object of the invention to provide an improved conveyor handling system.

SUMMARY OF THE INVENTION

According to the invention, there is provided a conveyor handling system, comprising two endless belts, each belt being supported by a respective pair of rollers which are situated at opposite ends of one of the runs thereof, the two belts being drivable at the same or different speeds and having their said one run serially arranged along a predetermined path with the downstream roller of the upstream run and the upstream roller of the downstream run having a common rotational axis, and means for displacing the said common axis along a line parallel to said predetermined path.

According to the invention, there is further provided a conveyor handling system, comprising two endless belts for conveying a stream of articles along a predetermined path, the two endless belts having their upper runs serially arranged along said predetermined path with the two belts at the two adjacent ends passing around a common rotary shaft, one said belt being directly driven by the shaft and the other said belt being driven by the shaft through a one way clutch, and means for reciprocating the common shaft along a common axis extending parallel to the predetermined path, the reciprocating means being so arranged as to displace the shaft during at least one of the forward and return strokes at a speed greater than that imparted to the belts by rotation of the shaft whereby to drive the said other belt at said greater speed while the said one belt continues to be driven at the speed imparted to it by the said shaft.

According to the invention, there is still further provided a conveyor system for separating into discrete batches a stream of articles arriving at regular intervals, the system including means for receiving the articles and defining a continuously movable variable length upstream conveyor and a continuously movable constant length downstream conveyor, and means for displacing the downstream conveyor between first and second positions and simultaneously varying the length of the upstream conveyor so as to maintain a continuous path between the two conveyors without altering the conveying speed of the upstream conveyor, the displacement of the downstream conveyor in a downstream sense producing an acceleration in the conveying speed of the downstream conveyor in the downstream sense while the upstream conveyor maintains a substantially constant conveying speed.

BRIEF DESCRIPTION OF THE DRAWINGS

A conveyor handling system embodying the invention for shingling meat slices and separating the shingled meat slices into separate batches will now be described, by way of example with reference to the accompanying diagrammatic drawings in which.

DESCRIPTION OF THE PREFERRED EMBODIMENTS

Figure 1:
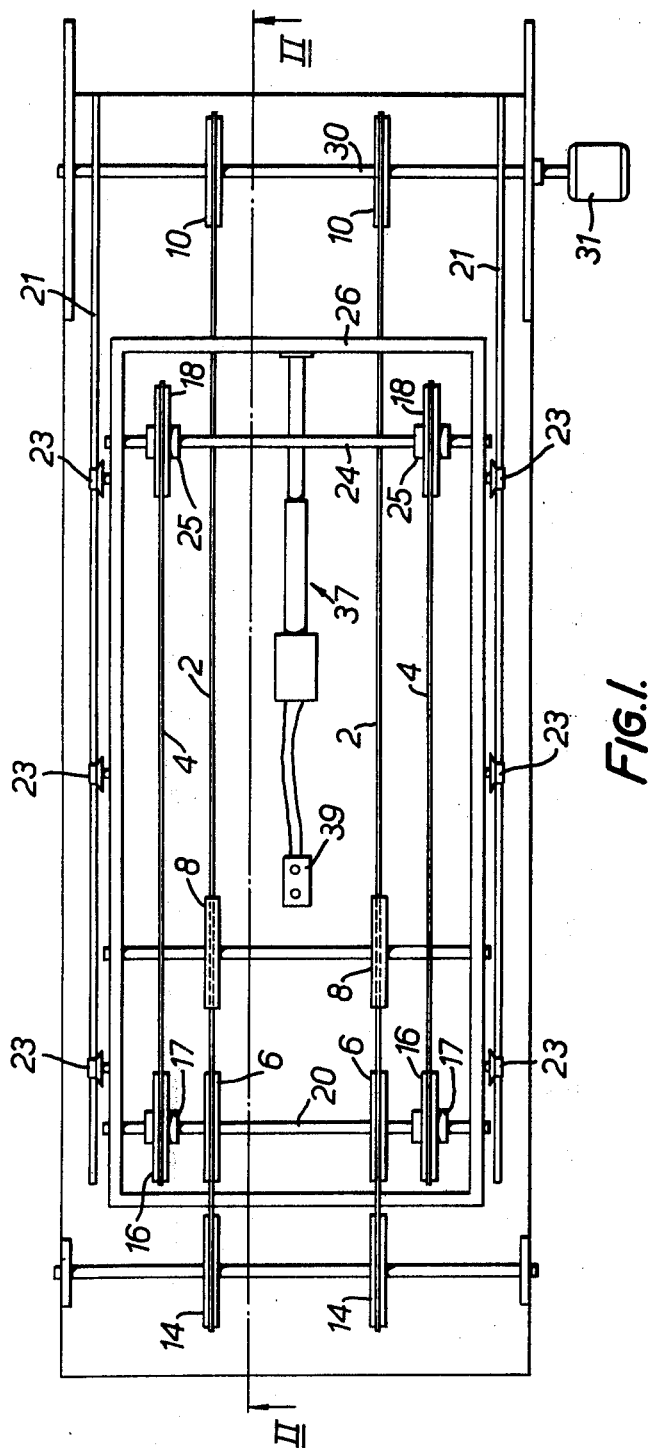
FIG. 1 is a plan view of the system in a first operative position.
Figure 2:
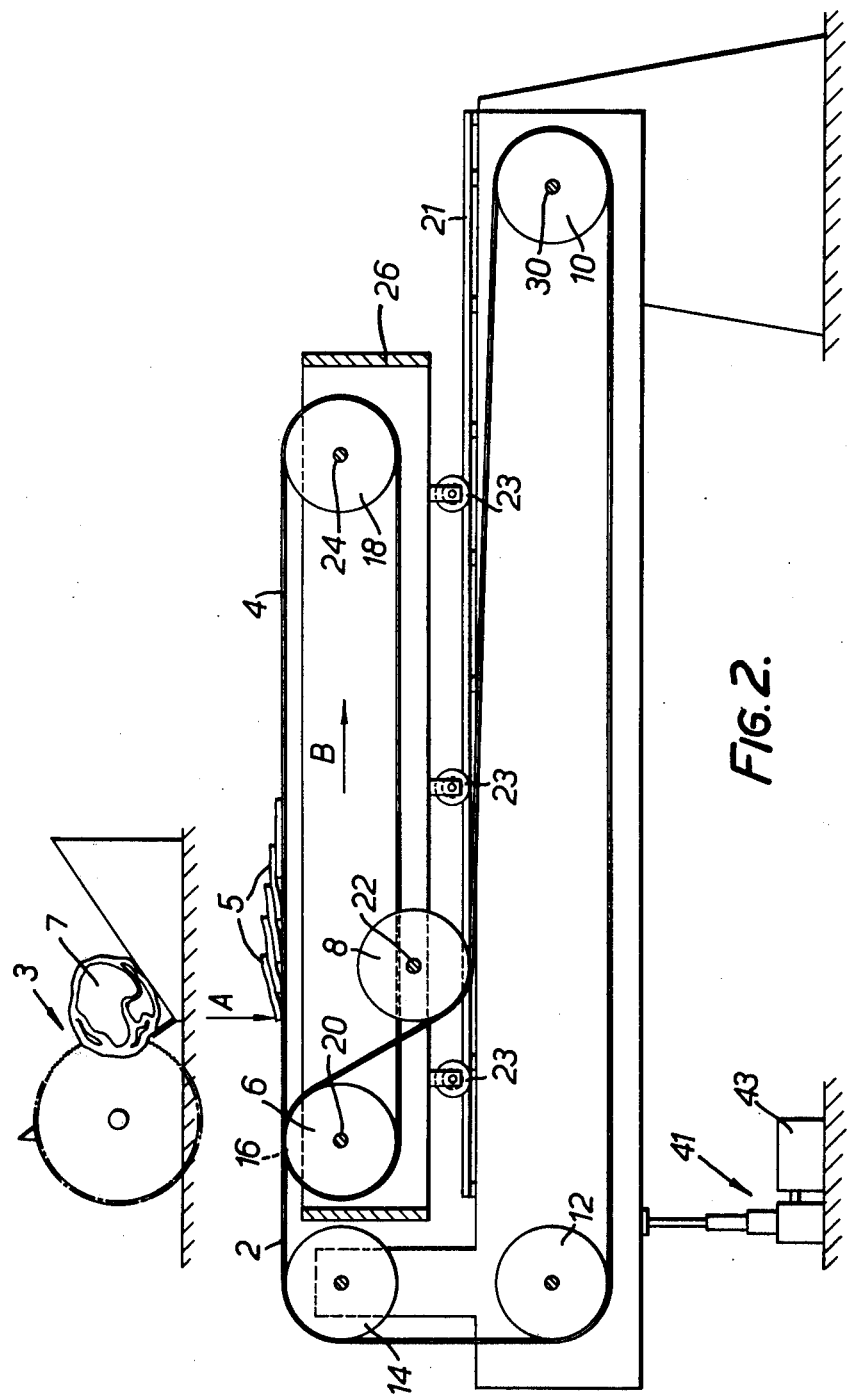
FIG. 2 is a longitudinal section of the system of FIG. 1 taken on the line II—II.

The conveyor handling system shown in FIGS. 1 and 2 is arranged to operate in conjunction with a meat slicer 3 (omitted from FIG. 1 for the sake of clarity) which deposits each slice 5 of meat, as it is cut from a block of meat 7, onto the upper run of the conveyor system at the upstream end thereof at a location indicated by the arrow A. The conveyor as viewed in FIGS. 1 and 2 moves from left to right. The conveyor moves at such speed relative to the slicing rate that as the meat slices 5 fall on the moving conveyor, they are automatically shingled (that is, arranged along the conveyor in partially overlapping form).

The conveyor handling system is actuatable in response to predetermined number of slices of meat 5 being deposited on the conveyor to accelerate the slices in the same direction as that in which they are moving so as to separate them from the next batch of shingled slices which are deposited on the conveyor from the slicer.

As shown in FIGS. 1 and 2, the conveyor system includes two pairs of endless belts 2 and 4. Each endless belt 2 extends around five pulleys, 6, 8, 10, 12 and 14, while each endless belt 4 extends around two pulleys 16 and 18. The pulleys 6 and 16 are axially spaced and are carried by a common shaft 20.

The shaft 20 as well as a shaft 22 carrying the pulley 8 and a shaft 24 carrying the pulley 18 are all mounted on a carriage 26. The carriage 26 has wheels 23 mounted on rails 21 to allow the carriage to run along the rails in opposite directions as indicated by the arrows B and C (see FIGS. 1 and 2). Movement of the carriage is controlled by a hydraulic actuator 37 which operates in response to a monitor 39 associated with the slicer 3. The upper runs of the two pairs of belts 2 and 4 define a continuous surface which is so arranged that an article carried by the belts 2 is transferred to the belts 4 without interruption in its movement.

The two pairs of belts 2 and 4 are driven by an electric motor 31 coupled to the shaft 30 on which the pulleys 10 are mounted. Each pulley 18 is mounted on the shaft 24 through a one way clutch 25 which allows the pulley 18 to rotate relative to the shaft 24 (which is rigid with the carriage) in a clockwise sense (as viewed in FIG. 1). Each pulley 6 is rigid with the shaft 20 while each pulley 16 is coupled to the shaft 10 by means of another one way clutch 17 which allows the pulley 16 to rotate in a clockwise sense (as viewed in FIG. 2) relative to the shaft 20. Thus when the carriage 26 is stationary, the belts 4 are driven at the same speed as the belts 2 by the belts 2 through the shaft 20 and corresponding one way clutches 17 and when the carriage 26 is displaced in the direction of the arrow B, the one way clutches 17 slip. This means that the upper run of the belts 4 continue to move at the same speed as the belts 2 until the speed of the carriage reaches the speed of the belts 2. When the carriage 26 exceeds the speed of the belts 2, the one way clutches 25 coupling the shaft 24 to the pulleys 18 lock. Thus the belts 4 are now stationary relative to the carriage and therefore the upper run of the belts 4 move at the same speed as the carriage. Movement of the carriage from the position indicated in FIG. 1 in the direction of the arrow B to the position shown in FIG. 2 increases the length of the upper run of the belt 2 and displaces the junction between the two belts in the direction of the arrow B.

In operation, starting from the time when the carriage lies in the position indicated in FIG. 1, slices of meat 5 are dropped onto the belt 4 at the location indicated by the arrow A. The belt 2 is driven by the motor 31 at a predetermined speed so that as the meat slices 5 fall on the conveyor they are automatically shingled (that is, arranged along the conveyor in partially overlapping form).

As soon as sufficient slices have fallen to make up the desired number of slices for a batch, the monitor 39 generates an output which actuates the hydraulic piston and cylinder arrangement 37. As a result the carriage 26 is rapidly displaced in the direction of the arrow B and the batch of slices on the belts 4 is accelerated in the direction of the arrow B at a speed equal to the speed of the carriage. At the same time, the junction between the belts 2 and 4 is displaced past the location A so that subsequent slices will fall on the belts 2 instead of the belts 4. In this way, successive batches of shingled slices are separated.

If the slicing machine which is operating continuously is operated at a high speed, the time period between successive slices being cut may be insufficient to allow the junction between the belts to clear the position A before the first slice dropped after carriage displacement is initiated reaches the conveyor. To increase the delay between successive slices reaching the conveyor system during the initial period of carriage displacement, the whole conveyor system (that is the support frame for the pulleys 10,12 and 14 as well as the carriage 26) is pivoted in an anticlockwise sense about the axis of the pulley 10 (as viewed in FIG. 2) under the control of a hydraulic actuator 41 which is driven by a motor 3 at a speed comparable to the speed at which a slice drops onto the conveyor system. This thus allows ample time for the junction between the pairs of belts 2 and 4 to clear the location A between successive slices. During this period of pivoting, small retaining wings (not shown) associated with the belt 4 move to clamp the meat slices already on the belt 4 against the belt 4 to ensure that the slices continue to be driven at high speed with the belt 4.

After the conveyor system has been pivoted through a predetermined angle, the carriage 26 is returned to its retracted position so that the junction between the pairs of belts 2 and 4 again passes through the location A and the slices which have already fallen on the belts 2 are smoothly transferred to the belts 4. Instead of pivoting, the conveyor system can be displaced in a direction generally perpendicular to the plane containing the upper run.

When the carriage has been returned, the whole conveyor system is pivoted slowly into its initial position by the actuator 41 at a constant speed so as to ensure that the slices continue to be shingled.

Figure 3:
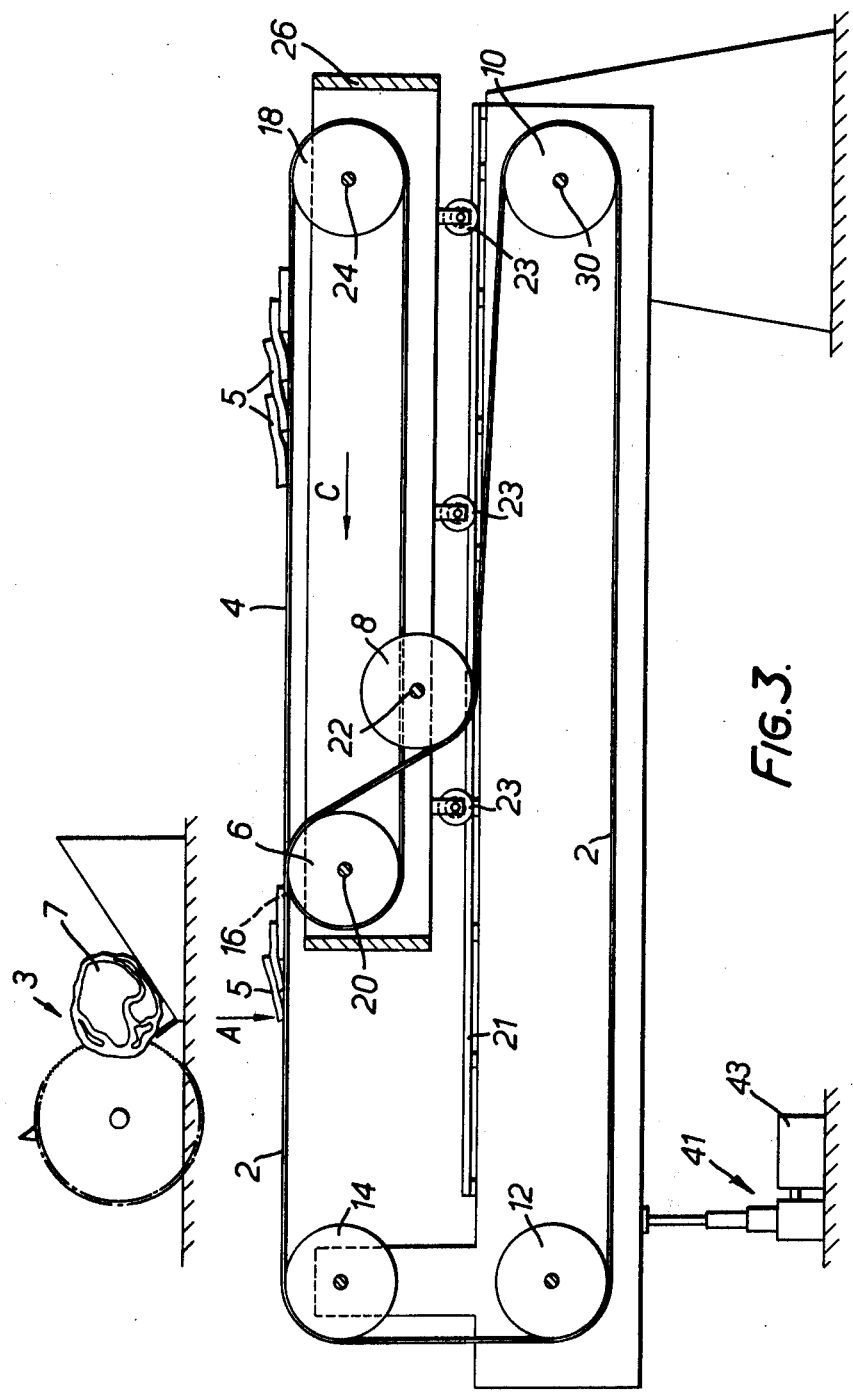
FIG. 3 is a longitudinal section of the system in a second operative position.

The retraction of the carriage from the position of FIG. 3 removes the support from under the batch of slices which had earlier fallen on the belts 4 and so allows the batch to fall, for example onto a weigher (not shown) for checking the weight of the batch.

The cycle is then repeated with the next batch of slices, and in this way successive slices are shingled and separated into batches.

The control system which controls the carriage displacement and the pivoting of the conveyor system is synchronised with the slicer which is controlled to vary the thickness of the slices in a sense to tend to maintain the batches of slices at a substantially constant weight.

Instead of just two pairs of belts 2 and 4, a plurality of stranded belts can be provided, the strands lying in parallel planes with each alternate plane containing a strand corresponding to the belt 2 and each intervening plane containing a strand corresponding to the belt 4. The strands are advantageously in the form of toothed belts, for example.

The conveyor system described is particularly suitable for batching and shingling bacon slices. It is also particularly suitable for use in the conveyor handling system described in our copending U.S. patent application Ser. No. 596,753 filed on 17th July, 1975.

It will be appreciated that the conveyor system can be used to handle articles other than slices of meat.

Figure 4:
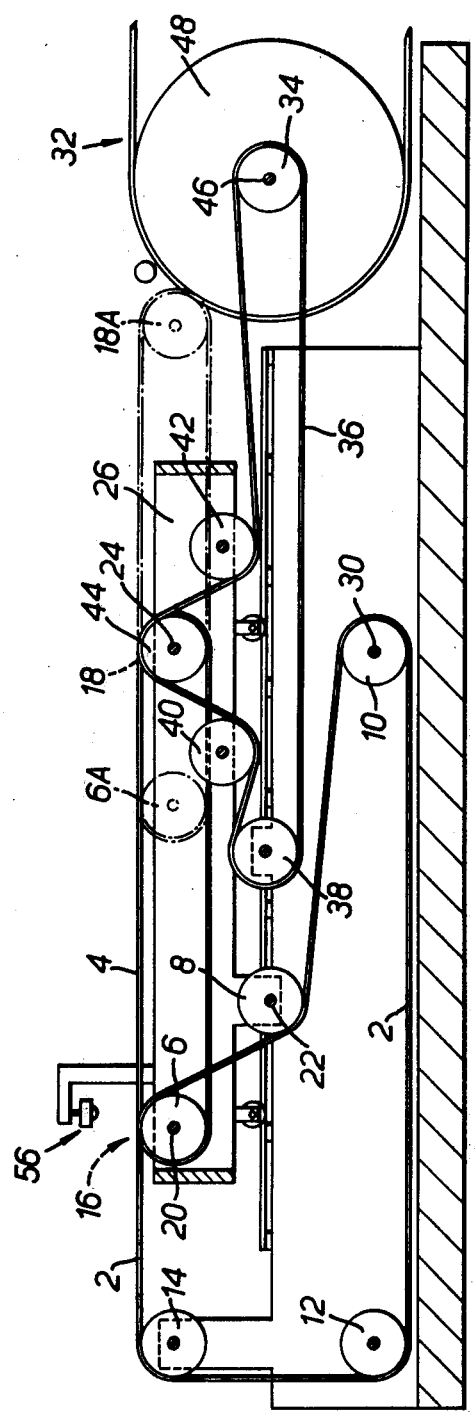
FIG. 4 is a longitudinal section of the system of FIGS. 1 to 3 coupled to an intermittantly driven conveyor.

FIG. 4 shows another application of the conveyor system of FIGS. 1 to 3 (but without the pivoting mechanism) for use in connection with an intermittent feed conveyor 32. Parts of the conveyor system of FIG. 4 similar to those of FIGS. 1 to 3 are similarly referenced.

The purpose of the conveyor system is to convert continuously moving batches of shingled bacon rashers into intermittently moving batches which are transferred to the intermittent feed conveyor 32.

As shown in FIG. 4, the shaft 24 which carries the pulley 18 (not visible in FIG. 4) also carries a pulley 44 which is coupled to the shaft 24 through a one way clutch (not shown). The one way clutch is such that it allows the pulley 44 to rotate relative to the shaft 24 in a clockwise sense as viewed in FIG. 3.

The conveyor 32 has a roller 48 at its upstream end which is rigid with a shaft 46. The shaft 46 carries a pulley 34 which is coupled to the shaft 46 through a one way clutch (not shown). This one way clutch allows rotation of the pulley 34 relative to the shaft 46 in a clockwise sense as viewed in FIG. 3.

The pulleys 44 and 34 are coupled by an endless belt 36 which, in addition to extending around the pulleys 34 and 44, also extends around further pulleys 38, 40 and 42. The pulleys 40 and 42 are rotatably mounted on the carriage 26.

In operation, batches of bacon slices (the slices having been pre-batched by other apparatus) are continuously and successively fed to the upstream end of the conveyor system onto belt 2. Since the belt 2 is continuously driven, the transfer of the batches takes place smoothly. Detection means 56 mounted on the carriage 26 detects each batch as it passes over the junction between the belts 2 and 4, and as a result, the carriage 26 is displaced from its left hand position shown in FIG. 3 into an extended position shown in broken lines (see roller 18A). Accordingly, the batch on the belt 4 is accelerated away from the next following batch on the belt 2. At this point the conveyor 32, which has hitherto been stationary, is now driven by a motor (not shown) at a speed higher than that of the belt 2 and, by means of the belt 36 and pulleys 34 and 44 together with their associated one way clutches, overrides the existing drive of the belt 4 to cause the belt 4 to be driven in synchronism with the conveyor 32 at the higher speed. Therefore, the batch lying on the belt 4 is smoothly transferred to the conveyor 32. After transfer has taken place, the conveyor 32 halts and the carriage 26 is retracted into its initial position again. Thereupon, the next batch of bacon slices is transferred from the belt 2 to the belt 4 and the cycle is repeated.

The conveyor 32 can advantageously form part of a packaging machine such as is disclosed in my copending U.S. patent application Ser. No. 620,286, filed Oct. 7, 1975 and entitled "Packaging Machines and Methods of Packaging Articles."

I claim:
1. A conveyor handling system comprising
   a first endless belt defining a variable length wherein the upstream run is of variable length,
   a first pair of rollers supporting the first belt and respectively located at the upstream and downstream ends of the upstream run,
   a second endless belt defining a fixed length and the downstream run is of fixed length,
   a second pair of rollers supporting the second belt and respectively located at the upstream and downstream ends of the downstream run, with the said downstream run being serially arranged downstream of the upstream run defined by the first belt, whereby the two said runs define a predetermined path,
   means supporting the downstream roller of the upstream run and the upstream roller of the downstream run for rotation about a common axis, and
   means for displacing the supporting means along a line parallel to said predetermined path.
2. A system according to claim 1, wherein the said support means comprises
   a common rotary shaft defining said common rotational axis, with which shaft the downstream roller of the first pair of rollers is rigid, and
   a one way clutch coupling the upstream roller of the second pair of rollers to the shaft.
3. A system according to claim 1, including
   a support carrying the said rollers and support means,
   a platform
   and means for pivotally coupling the support to the platform for pivoting the predetermined path about a point generally located at the downstream end of the downstream run.
4. A conveyor handling system, comprising
   first and second endless belts for conveying a stream of articles along a predetermined path,
   means supporting the two endless belts with their upper runs serially arranged along said predetermined path, the support means including a common rotary shaft about which the two belts at their adjacent ends pass,
   means directly coupling one said belt to the shaft,
   a one way clutch coupling the other said belt to the shaft, means for rotating said shaft, and
   means for reciprocating the common shaft along a common axis extending parallel to the predetermined path, the reciprocating means including means operative to displace the shaft during at least one of the forward and return strokes at a speed greater than that imparted to the belts by rotation of the shaft whereby to drive the said other belt at said greater speed while the said one belt continues to be driven at the speed imparted to it by the said shaft.
5. A system according to claim 4, including means for reciprocating said belts and the shaft in a direction generally perpendicular to said predetermined path and shaft in synchronism with the reciprocation of the said shaft by the first mentioned reciprocation means.
6. A system according to claim 4, including a meat slicer mounted above the predetermined path and arranged to drop successive slices of meat onto the predetermined path at a predetermined location, the predetermined location lying intermediate the limits of the stroke of the common axis.
7. A conveyor system for separating into discrete batches a stream of articles arriving at regular intervals, the system including
   means for receiving the articles and defining a continuously movable variable length upstream conveyor,
   means defining a continuously movable constant length downstream conveyor,
   drive means for driving the two conveyors at a predetermined speed, and
   means supporting the downstream conveyor for displacing the downstream conveyor between first and second positions and simultaneously varying the length of the upstream conveyor so as to maintain a continuous path between the two conveyors without altering the conveying speed of the upstream conveyor, the displacement of the downstream conveyor in a downstream sense producing an acceleration in the conveying speed of the downstream conveyor in the downstream sense while the upstream conveyor maintains a substantially constant conveying speed.
8. A system according to claim 7, including
   means for pivotally supporting the upstream and downstream conveyors for pivotal movement about an axis extending transversely to the conveying direction, and
   means connected to the conveyors and operative while the downstream conveyor is being driven from the first position to pivot the conveyors at such a speed and in such a sense as to increase, during the period of pivoting, the delay between the instants when successive articles reach the conveyor system.

* * * * *